United States Patent Office 3,203,550
Patented Aug. 31, 1965

3,203,550
METHOD FOR THE PREPARATION OF SUBSTITUTED S-TRIAZINE COMPOUNDS
Frederic Charles Schaefer, Darien, Conn., assignor to American Cyanamid Company, New York, N.Y., a corporation of Maine
No Drawing. Filed Mar. 7, 1960, Ser. No. 12,930
7 Claims. (Cl. 260—248)

This invention relates to an improved process for the preparation of substituted s-triazines. More particularly, this invention relates to a novel method for the preparation of both unsymmetrically and symmetrically substituted s-triazines. In a more particular aspect the present invention relates to a process for the preparation from an imidate and an amidine salt of mono-, di-, and trisubstituted s-triazines of the general formula:

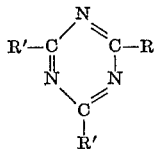

in which R is selected from the group consisting of hydrogen and a radical selected from the group consisting of unsubstituted and substituted alkyl, unsubstituted and substituted aryl, aralkyl, alkoxy, aryloxy, alkylthio, arylthio, amino, N-alkylamino, and N-arylamino and R' is selected from the group consisting of hydrogen, unsubstituted lower alkyl radicals and unsubstituted monocyclic aryl radicals.

It is well known that unsymmetrically and symmetrically substituted s-triazines may be prepared by any one of several procedures viz. the trimerization of nitriles, the reaction of an acid chloride and a nitrile in the presence of AlCl₃ and NH₄Cl and the reaction of an amidine with an anhydride. While each of these methods has met with some degree of success for the preparation of a limited number of compounds, no one method has proven to be of particularly wide application. While one method may be adaptable for the preparation of certain symmetrically substituted s-triazines and while another may be adaptable for the preparation of certain unsymmetrically substituted s-triazines a method capable of producing either or both types of s-triazines has been lacking to the present.

It has now been found that amidine salts may be reacted with imidates under a variety of conditions to give both unsymmetrically and symmetrically mono-, di- and trisubstituted s-triazine compounds. Unexpectedly, the reaction proceeds quite readily and high yields of s-triazines are obtained.

The method which I have discovered is surprisingly straightforward and is particularly advantageous in view of the fact that the starting materials are generally readily available. A further advantage of this new and improved method is that new and useful compounds heretofore not capable of being synthesized by prior art procedures may be easily prepared.

The reaction by which s-triazines are formed from amidine salts and imidates according to the process of my invention may be described as:

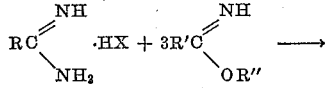

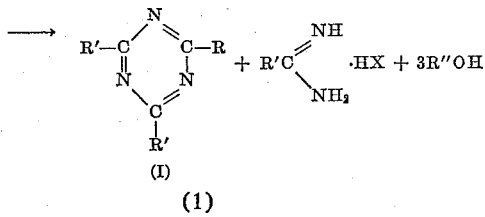
(I)
(1)

To some degree by-products of other substitutions are produced because of interchange reaction such as:

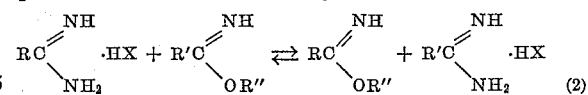 (2)

The amidine salt,

formed by the principal Reaction 1 may react to give

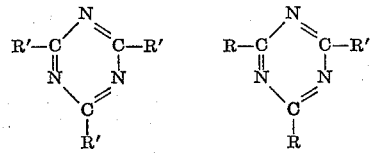

and

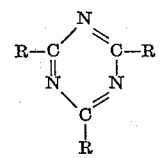

because of the complex reaction mechanism which is not entirely understood. Generally, a mixture containing all four possible substituted s-triazine products is formed but 45–85% yields of the desired product (Reaction 1) are usually obtained. In the structural reproductions given hereinabove R may be hydrogen or a radical selected from the group of alkyl both unsubstituted and substituted with such substituents as aryl, halo, hydroxy, di-alkoxy, and carbalkoxy; aryl both unsubstituted and substituted with such substituents as cyano, nitro, halo, lower alkoxy; alkoxy; aryloxy; alkylthio; arylthio; amino; N-alkyl amino; and N-aryl amino; R' may be hydrogen or a radical selected from the group of unsubstituted lower alkyl radicals and unsubstituted monocyclic aryl radicals; and R'' may be a lower alkyl radical such as methyl, ethyl, isopropyl, propyl, isobutyl, and butyl. The salt portion, HX, may be derived from any carboxylic acid or stronger acid with $Ka \geq 10^{-6}$ such as formic, acetic, propionic, and the like and hydrochloric, hydrobromic, hydriodic, nitric, sulfuric, and the like. Frequently, the halide salts are preferred since they are more soluble in the reaction mass than the sulfate, nitrate, or acetate.

Any of a large variety of acid addition salts of amidines can be employed in the process of the invention. Typical illustrative amidine salts include those salts of formamidine, acetamidine, propionamidine, butyramidine, lauramidine, benzamidine, α-naphthamidine, α-phenylacetamidine, O-methylisourea, S-methylisothiourea, S-ethylisothiourea, S-phenylisothiourea, trichloroacetamidine, 2,2-diethoxyacetamidine, β-hydroxypropionamidine, α-chloropropionamidine, 2-(1-isobutoxy)propionamidine, 1-acetoxypropionamidine, 2-cyanoisobutyramidine, guanidine, N-dodecylguanidine, and N-phenylguanidine. These and a variety of other amidine salts may be readily prepared by methods which are well-known and which form no part of the present invention.

Similarly, the imidate reactant or imino ether, preferably a liquid or low melting solid, is easily obtained from an appropriate nitrile and alcohol according to other well-known methods of preparation. Among the numerous imidates which may be employed in the present process there may be listed, inter alia, ethyl acetimidate, ethyl propionimidate, isopropyl acetimidate, methyl isopropoxy acetimidate, methyl benzimidate, ethyl α-phenylacetimidate, methyl α-chloroacetimidate, ethyl α-chloropropionimidate, and the like.

Because the substituted s-triazines find utility as agricultural biocides, surface active compounds, dye intermediates, polymer intermediates, pharmaceutical intermediates, and the like, a practical method for their preparation would be highly desirable. Thus, compounds obtained in accordance with the present invention wherein R' is a lower alkyl radical and R is an alkoxy group find use as intermediates in the preparation of valuable antibacterial agents which are effective against various bacterial infections, for example, streptococcal and staphylococcal infections. Such antibacterial agents are readily prepared by reacting an alkali metal sulfanilamide with a 2,4-lower alkyl-6-lower alkoxy-s-triazine. The present method overcomes numerous disadvantages inherent in the processes of the prior art and offers a simple, effective, and straightforward process for the preparation of s-triazines.

In carrying out the reaction, the imidate is usually added at once or sometimes gradually to the amidine salt which may be partially dissolved in an alcohol. The reaction may be exothermic and may be completed quickly or it may be sluggish and require a prolonged period of time for completion. However, controlled heating of the reaction mixture may be employed to speed the process. In general, temperatures of from 0° to 100° C. may be used, with temperatures in the range of 25° to 80° C. being preferred. No particular advantage is seen in conducting the reaction at temperatures in excess of 100° C. inasmuch as by-product alcohol which is formed during the course of the reaction boils at temperatures generally below 100° C. and also since at higher temperatures degradation of the imidate to the nitrile and alcohol takes place. The use of a solvent is generally not required. However, since the amidine salt is frequently insoluble in the imidate, it is desirable to improve the solubility of the amidine salt by the addition of a small amount of alcohol. Any lower alcohol such as methyl alcohol, ethyl alcohol, or propyl alcohol may be employed as solvent for the reaction mass. The amount of such alcohols which is ordinarily added is usually in a limited amount inasmuch as an excessive dilution of the reaction mass impedes the rate of reaction.

Generally, three moles of imidate are required for each mole of amidine salt. However, it is possible to use an amount of imidate greater than three moles per mole of amidine salt in order to minimize the introduction of the "R" substituent and by so doing a larger amount of the trimer of the imidate is thereby obtained.

The s-triazine products may range from liquids to solids. In those instances wherein lower alkyl groupings are attached to the triazine nucleus, distillation affords an easy method of separation. However, other conventional methods of separation and purification such as precipitation by non-solvents, crystallization, and the like may be readily employed.

In most cases the time of reaction is that of a few hours. However, depending upon the structure and also the mutual solubility of the reactants, several days reaction time may be necessary.

In order to further illustrate the nature of this invention, the following examples in which all parts are by weight unless otherwise indicated are given.

*Example 1.—2-methyl-s-triazine and 2,4-dimethyl-s-triazine*

Into a suitable three-necked round bottom flask connected to a mechanical stirrer and reflux condenser and heated by a heating mantle are placed 48 parts (0.6 mole) of formamidine hydrochloride and 20 parts of ethyl alcohol. Twenty parts of ethyl acetimidate are added at once and over a period of 15 minutes 20 additional parts of ethyl acetimidate are added drop-wise. At this time most of the solid amidine salt dissolves or has dissolved, with a slight exotherm. The mixture is stirred until the solid has completly dissolved and the heat of the reaction maintains the temperature at about 35° C. Crystallization of acetamidine hydrochloride is initiated by seeding whereupon the temperature rises to 38° C. The remainder of 79 parts (0.9 mole total) of ethyl acetimidate is then added drop-wise over a period of an hour while stirring and warming the reaction mass so as to maintain a temperature of 35°–40° C. The mixture is stirred for an additional hour and is allowed to stand overnight.

One hundred parts of absolute ether is added with stirring and the mixture is stirred for 2 hours and filtered. The by-product solid, after washing with ether and drying in a vacuum desiccator, amounts to 51 parts of acetimidine hydrochloride, M.P. 170–6° C. or 90% yield. The filtrate is freed of ether and part of the ethyl alcohol by distillation through a 22″ column of glass helices at atmospheric pressure. The residue is stripped of volatiles which are then fractionally distilled through a column of glass helices to yield 14.8 parts of 2-methyl-s-triazine and 8.26 parts of 2,4-dimethyl-s-triazine.

*Example 2.—2-ethyl-s-triazine and 2,4-diethyl-s-triazine*

To a mixture of 106 parts (1.3 moles) of formamidine hydrochloride and 50 parts of ethyl alcohol is added with stirring 30 parts of ethyl propionimidate in one portion, and another 30 part portion over a ten-minute period. The mixture is warmed to 40° C. and after 10 parts of ethyl propionimidate are added, the solid is dissolved. Only a slight exotherm is evident.

The mixture is stirred for ten minutes and another 20 parts of ethyl propionimidate are added dropwise.

The temperature is raised to 50–60° C. and the remainder of the total of 214 parts (2.0 moles) of 94% ethyl propionimidate is added over a period of 100 minutes. After warming for an additional 100 minutes, the mixture is allowed to stand overnight.

Absolute ether (450 parts) is added to the mixture which is worked up as in the procedure for 2-methyl- and 2,4-dimethyl-s-triazine. Seventy-five parts of propionamidine hydrochloride, M.P. 105–130° C. is obtained. The residue obtained after stripping volatiles is 33 parts of a yellow solid which after shaking with ether and drying melts at a temperature below 60° C.

The volatiles are distilled through a column of glass helices and the following yields are obtained: 19 parts of 2-ethyl-s-triazine, B.P. 130–150° C. and 50 parts 2,4-diethyl-s-triazine, B.P. 59–66° C./10 mm.

*Example 3.—2,4-dimethyl-6-phenyl-s-triazine*

A mixture of 26.1 parts (0.30 mole) of ethyl acetimidate and 15.7 parts (0.10 mole) of anhydrous benzamidine hydrochloride is warmed at temperatures of 50–60° C. and a mildly exothermic action ensues. At the end of thirty minutes the amidine salt is completely dissolved. After another thirty minutes has elapsed acetamidine hydrochloride begins to crystallize from the still warm solution. The reaction mixture is allowed to stand overnight. The solid is then filtered out and washed with acetonitrile. After drying, 6.7 parts of acetimidine hydrochloride, M.P. 171–173° C., is obtained. The filtrate from the reaction mixture is diluted with water and the triazine product is extracted with ether. The ether solution is dried with calcium sulfate and distilled. A 10.0 parts yield of 2,4-dimethyl-6-phenyl-s-triazine, B.P. 93–96° C./1.5 mm., F.P. 34° C. is obtained.

A trace of higher boiling material identified as 2-methyl-4,6-diphenyl-s-triazine is also recovered.

*Example 4.—2-(α-chloroethyl)-4,6-dimethyl-s-triazine*

A mixture of 196 parts (1.25 moles) of α-chloropropionamidine hydrochloride and 430 parts (3.76 moles) of ethyl acetimidate (93%) is held at about 15° C. for 4 hours and then allowed to stand at room temperature overnight. The impure acetamidine hydrochloride which crystallizes out during this time is filtered to yield 120 parts of acetamidine hydrochloride. The filtrate is stripped at atmospheric pressure to remove most of the low boiling material present. The residue is fractionally distilled in order to get maximum separation of by-products 2,4,6-trimethyl-s-triazine (B.P. 155–156° C.) and 2,4-bis-(α-chloroethyl)-6-methyl-s-triazine (B.P. 130–135° C./24 mm.) from the desired product which boils at 99°–102° C./24 mm. One hundred and six parts of product 2-(α-chloroethyl)-4,6-dimethyl-s-triazine which is characterized by $n_D^{28.5}$ 1.4901 and B.P. 23° C. is obtained. From the same distillation 36 parts of 2,4-bis-(α-chloroethyl)-6-methyl-s-triazine is obtained.

*Example 5.—2-methoxy-4,6-dimethyl-s-triazine*

Ninety-four parts (1.02 moles) of 95% ethyl acetimidate is added to 37.8 parts (0.341 mole) of methylpseudourea hydrochloride causing a moderately exothermic reaction. The mixture which spontaneously heats up to boiling in ten to fifteen minutes is held at gentle reflux by cooling and after the reaction subsides is allowed to cool at room temperature for 1.5 hours. The crystalline product, acetamidine hydrochloride, is filtered, washed with acetonitrile and dried under vacuum. 24.8 parts of acetamidine hydrochloride, M.P. 165–170° C. are obtained. The filtrate from the reaction mixture is fractionally distilled, yielding 31.6 parts of 2-methoxy-4,6-dimethyl-s-triazine, B.P. 80° C./3 mm., M.P. 43.5 and 4 parts of 2,4,6-trimethyl-s-triazine.

*Example 6.—2,4-diethyl-6-methoxy-s-triazine*

225.3 parts (1.851 moles) of ethyl propionimidate (80%) and 68.3 parts (0.618 mole) of methylisourea hydrochloride are mixed in a suitable reaction vessel and a mildly exothermic reaction ensues. The reaction mixture is refluxed gently for 1.5 hours. The reaction mixture is then cooled overnight and the resulting white crystalline solid (propionamidine hydrochloride), 45 parts, is filtered from the solution.

The filtrate is vacuum distilled and 53.9 parts of 2,4-diethyl-6-methoxy-s-triazine, a clear colorless liquid, B.P. 58–64° C./0.75 mm., is obtained. The product, 2-methoxy-4,6-diethyl-s-triazine, is further purified by chilling the liquid for one hour at 10° C. and by removing the supernatant liquid. An analytical sample of the material has a refractive index of $n_D^{20}$ 1.4765.

*Example 7.—2-(2-hydroxyethyl)-4,6-dimethyl-s-triazine*

A mixture of 87 parts (1.0 mole) of ethyl acetimidate, 50 parts (0.40 mole) of 3-hydroxypropionamidine hydrochloride and 15 parts of ethanol is heated to 50° C. and shaken to dissolve the solid. The reaction mixture is allowed to stand at room temperature for 40 hours. The liquid portion is then decanted from acetamidine hydrochloride which crystallizes out. The product solution is diluted with 250 parts of ether to precipitate additional amidine salt which crystallizes slowly. The liquid is then evaporated at about 30° C. and low pressure to remove solvents and some by-product trimethyl-s-triazine. The residue (31 parts) is substantially pure 2-(2-hydroxyethyl)-4,6-dimethyl-s-triazine, B.P. 890 C./1.5 mm. A small amount of 2-methyl-4,6-bis-(2-hydroxyethyl)-s-triazine is also obtained.

*Example 8.—2-(1-cyano-1-methylethyl)-4,6-dimethyl-s-triazine*

Ethyl acetimidate (0.25 mole) is added dropwise to crude 2-cyanoisobutyramidine hydrochloride syrup (0.062 mole) with an attendant exotherm. The mixture is stirred briefly to obtain a homogeneous solution. The acetamidine hydrochloride, which crystallizes upon standing overnight, is filtered and a yield of 61.5% of the amidine salt, M.P. 160° C. is obtained. The filtrate is then distilled in vacuo and crude product, B.P. 96–110° C./4–5 mm., is obtained in addition to small quantities of ethanol, unreacted ethyl acetimidate, and 2,4,6-trimethyl-s-triazine. Redistillation of the crude product affords an analytically pure material, B.P. 88–93° C./2.5–3 mm., $n_D^{24.5}$ 1.4795, which solidifies at room temperature.

*Example 9.—2,4-dimethyl-6-methylthio-s-triazine*

43.6 parts (0.2 mole) of S-methylisothiourea hydroiodide and 52.2 parts (0.6 mole) of ethyl acetimidate are refluxed at 80° C. for 2.5 hours. By-product acetamidine hydroiodide crystallizes out upon chilling of reaction mass. The mother liquor is diluted with water and the product triazine obtained in good yield is extracted with ether. The ether solution is dried and evaporated. A portion of the product is recrystallized from cyclohexane, M.P. 56–57° C. The remainder is distilled, B.P. 73° C./4 mm.

*Example 10.—2,4-diethyl-6-methylthio-s-triazine*

S-methylisothiourea hydroiodide and ethyl propionimidate are mixed and allowed to stand for 24 hours at a temperature from 25–40° C. The reaction mixture is diluted with water and extracted with ether. The ether solution is dried and distilled to afford a good yield of 2,4-diethyl-6-methylthio-s-triazine, B.P. 123° C./17 mm., F.P. 35° C.

*Example 11.—2-[1-(1-isobutoxyethoxy)ethyl]-4,6-dimethyl-s-triazine*

15.0 parts of 2-(1-isobutoxyethoxy)-propionamidine hydrochloride and 17.4 parts of ethyl acetimidate are allowed to stand for 8 days at 25° C. after adequate initial mixing. By-product acetamidine hydrochloride is filtered and the mother liquor is distilled to yield 9.0 parts of 2-[1-(1-isobutoxyethoxy)ethyl]-4,6-dimethyl-s-triazine, B.P. 96° C./2 mm.

*Example 12.—2-benzyl-4,6-dimethyl-s-triazine and 2,4-dibenzyl-6-methyl-s-triazine*

16.7 parts (0.1 mole) of α-phenylacetamidine hydrochloride and 26.1 parts (0.3 mole) of 98% ethyl acetimidate are allowed to stand for 12 days at 25° C. after adequate initial mixing. By-product acetamidine hydrochloride crystals are filtered from the reaction mixture and the mother liquor is distilled to afford 5.2 parts of 2-benzyl-4,6-dimethyl-s-triazine, B.P. 107° C./2 mm. and 0.9 part of 2,4-dibenzyl-6-methyl-s-triazine, B.P. 170° C./2 mm.

*Example 13.—2,4 - bis[1-(isobutoxyethoxy)ethyl]-s-triazine and 2-[1-(1-isobutoxyethoxy)-ethyl]-s-triazine*

20.6 parts (0.256 mole) of formamidine hydrochloride and 56.5 parts (0.256 mole) of 92% methyl 2(1-isobutoxyethoxy)propionimidate and 5 parts of methanol are mixed in a suitable reaction vessel and allowed to react for 5 hours at 80–85° C. The reaction mass is worked up as in the preceding example. There are recovered 3 parts of 2,4-bis[1 - (isobutoxyethoxy)ethyl] - s - triazine, B.P. 147–153° C./1.5 mm., $n_D^{23}$ 1.4540 is obtained and 31 parts 2[1-(1-isobutoxyethoxy)-ethyl]-s-triazine, B.P. 110° C./2 mm., in 31 parts.

*Example 14.—2,4-di(1-chloroethyl)-6-phenyl-s-triazine*

11.1 parts (0.071 mole) of benzamidine hydrochloride and 31.4 parts (0.213 mole) of 92% ethyl 2-chloropropionimidate are reacted at 85–90° C. for a period of 4.5 hours. The reaction mixture is diluted with water and is extracted with ether. The ether solution is dried and distilled to afford a good yield of 2,4-di(1-chloroethyl)-6-phenyl-s-triazine, B.P. 180–185° C./5 mm., M.P. 55–58° C. from heptane.

*Example 15.—2-(1,1-diethoxymethyl)-4,6-dimethyl-s-triazine*

8.0 parts (0.044 mole) of 2,2-diethoxyacetamidine hydrochloride and 13 parts (0.15 mole) of ethyl acetimidate are mixed and allowed to stand for 3 days at 25° C. The reaction mixture is worked up as in the preceding example and a good yield of 2-(1,1-diethoxymethyl)-4,6-dimethyl-s-triazine, B.P. 95–100° C./3 mm., is obtained together with a small amount of tris-(1,1-diethoxymethyl)-s-triazine, B.P. 182–183° C./3 mm.

*Example 16.—2-(1,1-diethoxypropyl)-4,6-dimethyl-s-triazine*

5.8 parts (0.028 mole) of 4,4-diethoxybutyramidine hydrochloride and 9.6 parts (0.11 mole) of ethyl acetimidate are mixed and allowed to stand for 2 days at 25° C. The reaction mass is worked up as in the preceding example. 2.1 parts of 2-(1,1-diethoxypropyl)-4,6-dimethyl-s-triazine, B.P. 114–116° C./3 mm., is obtained.

*Example 17.—2-(1-acetoxyethyl)-4,6-dimethyl-s-triazine*

Twenty parts (0.16 mole) of 1-acetoxy propionamidine hydrochloride and 42 parts (0.48 mole) of ethyl acetimidate are mixed and are allowed to stand for 3 days at 25–35° C. The reaction mixture is worked up as in the preceding example and a good yield of 2-(1-acetoxyethyl)-4,6-dimethyl-s-triazine, B.P. 115–130° C./23 mm., is obtained.

*Example 18.—2-methyl-s-triazine; 2,4-dimethyl-s-triazine; 2,4,6-trimethyl-s-triazine*

Three hundred parts (3.86 moles) of 90% ethyl acetimidate is added dropwise with stirring over a period of 3½ hours to 268 parts (2.08 moles) of formamidine acetate while the temperature of the reaction mixture is maintained at 70° C. The solution is allowed to stand for 20 hours at 25° C. Insoluble amidine acetate is filtered and the filtrate is evaporated to remove most of the ethanol. The residue is diluted with petroleum ether in order to crystallize additional amidine salt, and the petroleum ether solution is then evaporated. Good yields of each of the following products, whose identity is confirmed by mass spectroscopic examination, are obtained: 33.1 parts of 2-methyl-s-triazine; 65 parts of 2,4-dimethyl-s-triazine; 12.3 parts of 2,4,6-trimethyl-s-triazine and 3.2 parts of s-triazine.

I claim:
1. A method of preparing a substituted s-triazine of the general formula:

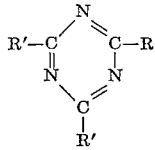

in which R is selected from the group consisting of hydrogen; unsubstituted alkyl having from 1 to 12 carbon atoms; monocyclic aryl-, halo-, cyano-, hydroxy-, di-lower-alkoxy- and carb-lower-alkoxy-substituted alkyl having from 1 to 12 carbon atoms; unsubstituted monocyclic aryl; cyano-, nitro-, halo-, and lower alkoxy-substituted monocyclic aryl; lower alkoxy; monocyclic aryloxy; lower alkylthio; monocyclic arylthio; amino; N-alkylamino in which the alkyl portion is from 1 to 12 carbon atoms; and N-arylamino in which the aryl portion is monocyclic aryl and R' is selected from the group consisting of hydrogen, unsubstituted lower alkyl and unsubstituted monocyclic aryl which comprises the steps of reacting by bringing into contact an amidine salt of the general formula:

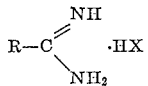

in which R is defined as hereinabove and X is a univalent anion selected from the group consisting of anions derived from an acid selected from the group consisting of formic, acetic, propionic, hydrochloric, hydrobromic, hydriodic, nitric and sulfuric with an imidate of the general formula:

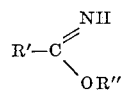

in which R' is defined as hereinabove and R" is selected from the group consisting of lower alkyl at a temperature between about 0° C. and about 100° C. in which the molar ratio of reactants is about 1:3::amidine salt: imidate and recovering the resultant substituted s-triazine.

2. A method of preparing 2,4-diethyl-6-methoxy-s-triazine which comprises the steps of reacting by bringing into contact methylisourea hydrochloride and ethyl propionimidate at a temperature between about 0° C. and about 100° C. and recovering resultant 2,4-diethyl-6-methoxy-s-triazine.

3. A method of preparing 2-α-chloroethyl-4,6-dimethyl-s-triazine which comprises the steps of reacting by bringing into contact α-chloropropionamidine hydrochloride and ethyl acetimidate at a temperature between about 0° C. and about 100° C. and recovering resultant 2-α-chloroethyl-4,6-dimethyl-s-triazine.

4. A method of preparing 2,4-diethyl-6-methylthio-s-triazine which comprises the steps of reacting by bringing into contact S-methylisothiourea hydroiodide and ethyl propionimidate at a temperature between about 0° C. and about 100° C. and recovering resultant 2,4-diethyl-6-methylthio-s-triazine.

5. A method of preparing 2-benzyl-4,6-dimethyl-s-triazine which comprises the steps of reacting by bringing into contact α-phenylacetamidine hydrochloride and ethyl acetimidate at a temperature between about 0° C. and about 100° C. and recovering resultant 2-benzyl-4,6-dimethyl-s-triazine.

6. A method of preparing 2-(1,1-diethoxymethyl)-4,6-dimethyl-s-triazine which comprises the steps of reacting by bringing into contact 2,2-diethoxyacetamidine hydrochloride and ethyl acetimidate at a temperature between about 0° C. and about 100° C. and recovering resultant 2-(1,1-diethoxymethyl)-4,6-dimethyl-s-triazine.

7. 2-(1,1-diethoxymethyl)-4,6-dimethyl-s-triazine.

References Cited by the Examiner

UNITED STATES PATENTS

| | | | |
|---|---|---|---|
| 1,911,689 | 5/33 | Hentrich et al. | 260—248 |
| 2,084,731 | 6/37 | Gyr et al. | 260—153 |
| 2,566,225 | 8/51 | Mackay et al. | 260—249.6 |
| 2,777,847 | 1/57 | Grundmann et al. | 260—248 |
| 2,845,422 | 7/58 | Schaefer et al. | 260—248 |
| 2,849,451 | 8/58 | Hechenbliekner et al. | 260—248 |
| 2,876,221 | 3/59 | Schroeder et al. | 260—248 |
| 2,878,250 | 3/59 | Schaefer | 260—248 |
| 2,914,523 | 11/59 | Grundmann et al. | 260—248 X |
| 2,996,505 | 8/61 | Schwarze | 260—248 X |
| 3,062,818 | 11/62 | Schaefer et al. | 260—248 |

FOREIGN PATENTS

| | | |
|---|---|---|
| 199,193 | 8/58 | Australia. |
| 1,085,761 | 8/54 | France. |

(Other references on following page)

OTHER REFERENCES

Bergmann, The Chemistry of Acetylene and Related Compounds, page 80, Interscience Publishers, Inc., New York (1948).

Grundmann et al., Journ. of the Amer. Chem. Soc., volume 76, pages 5646 to 5650 (1954).

Johnson et al., Journal of the American Chemical Society, volume 44, pages 1341–1343 (1922).

Ostrogovich, Chemiker Zeitung, volume 36, No. 78, pages 738–9 (1912).

Otto et al., Journ. fur Prakt. Chemie, volume 144, pages 78 to 98 (1887).

Reinhardt et al., Chemiche Berichte, vol. 90, pages 2643–5 (1957).

Schaefer et al., Journ. of the Amer. Chem. Soc., volume 81, pages 1466 to 1474 (March 20, 1959).

Smolin et al., "s-Triazines and Derivatives," pages 147–8, 155–6, 159, 162, 172–175, 188 and 219–221, Interscience Publishers, Inc., New York (February 1959).

Shriner et al., Chemical Reviews, volume 35, page 388 (1944).

Troeger, Journ, fur Prak. Chemie, volume 158, pages 446 to 451 (1894).

WALTER A. MODANCE, *Primary Examiner.*

DUVAL T. McCUTCHEN, IRVING MARCUS,
*Examiners.*